(12) United States Patent
Lancashire

(10) Patent No.: US 9,507,070 B2
(45) Date of Patent: Nov. 29, 2016

(54) LIGHTING GUIDE

(71) Applicant: Abtech Limited, Sheffield (GB)

(72) Inventor: Mike Lancashire, Sheffield (GB)

(73) Assignee: ABTECH LIMITED, Sheffield (GB)

( * ) Notice: Subject to any disclaimer, the term of this patent is extended or adjusted under 35 U.S.C. 154(b) by 0 days.

(21) Appl. No.: 14/817,365

(22) Filed: Aug. 4, 2015

(65) Prior Publication Data
US 2016/0085011 A1 Mar. 24, 2016

(30) Foreign Application Priority Data
Sep. 24, 2014 (GB) .................................. 1416865.2

(51) Int. Cl.
| | |
|---|---|
| F21V 1/00 | (2006.01) |
| F21V 8/00 | (2006.01) |
| F21K 99/00 | (2016.01) |
| F21V 7/04 | (2006.01) |
| F21V 7/22 | (2006.01) |
| F21V 31/00 | (2006.01) |
| F21Y 101/02 | (2006.01) |

(52) U.S. Cl.
CPC .............. *G02B 6/0001* (2013.01); *F21K 9/52* (2013.01); *F21V 7/043* (2013.01); *F21V 7/22* (2013.01); *F21V 31/005* (2013.01); *G02B 6/001* (2013.01); *F21Y 2101/02* (2013.01)

(58) Field of Classification Search
CPC ............ F21K 9/52; F21V 7/043; F21V 7/22; F21V 31/005; G02B 6/0001
USPC ......................................................... 362/235
See application file for complete search history.

(56) References Cited

U.S. PATENT DOCUMENTS

| | | | | |
|---|---|---|---|---|
| 7,128,454 B2 * | 10/2006 | Kim | .......................... | F21K 9/00 361/704 |
| 2010/0020543 A1 | 1/2010 | Yiu et al. | | |

* cited by examiner

*Primary Examiner* — Andrew Coughlin
*Assistant Examiner* — Meghan Ulanday
(74) *Attorney, Agent, or Firm* — King & Schickli, PLLC

(57) ABSTRACT

A lighting guide is disclosed for a lighting apparatus, which comprises an elongate and substantially transparent member having opposed ends. A longitudinal portion of an outer surface of the member is linearly recessed symmetrically about a transversal main axis of the member. A transversal distance of the recessed portion relative to a longitudinal portion of the outer surface opposed to the recessed portion increases progressively in either direction away from the transversal main axis of the member. A lighting apparatus is also disclosed, which comprises the lighting guide and two light sources located adjacent respective and opposed ends of the member.

14 Claims, 6 Drawing Sheets

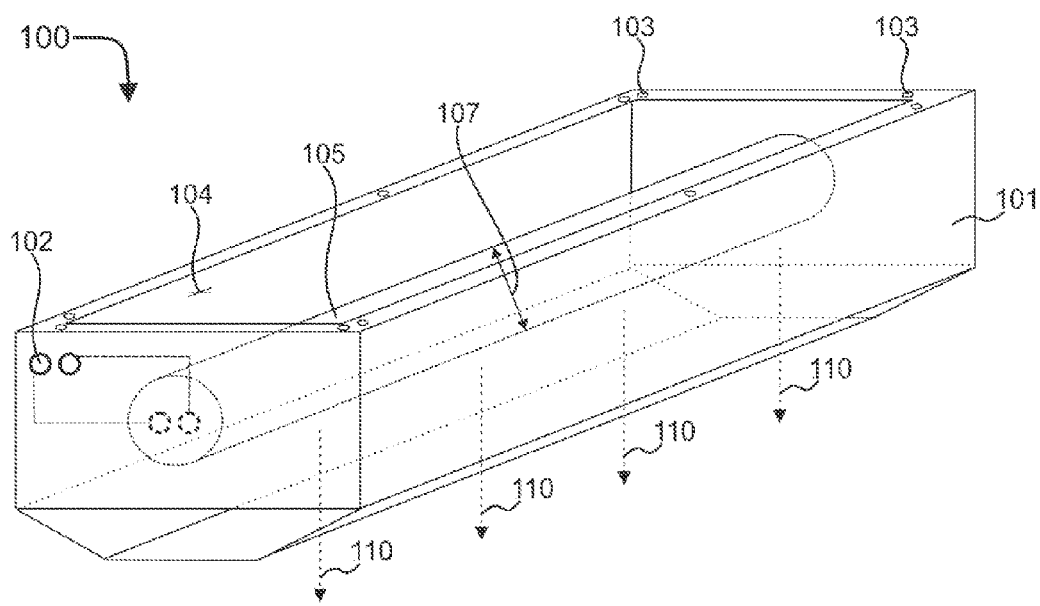
Figure 1 [PRIOR ART]
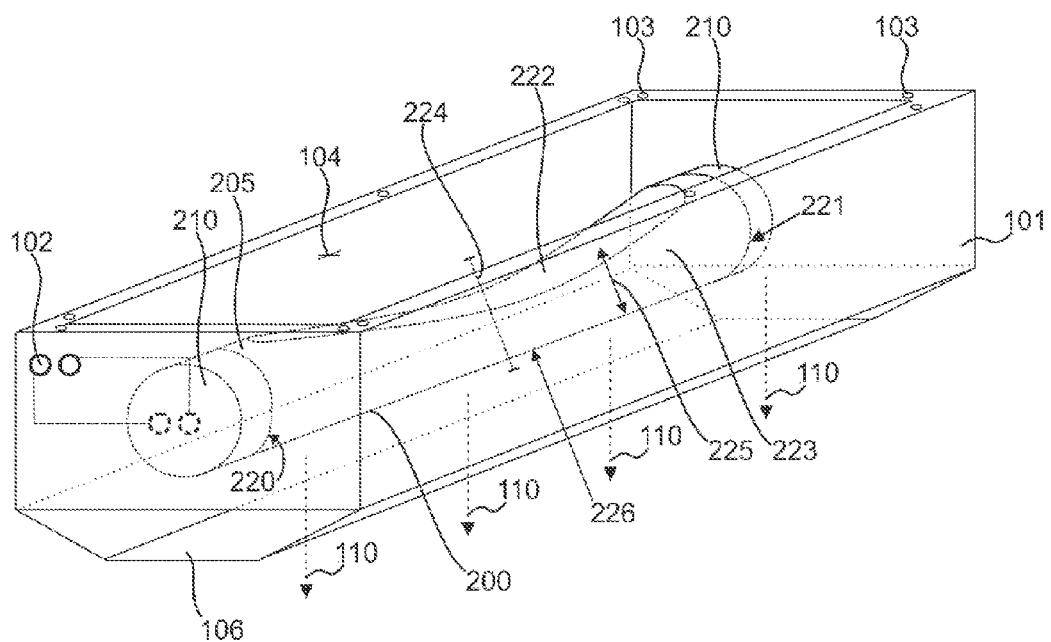
Figure 2

LIGHTING GUIDE

FIELD OF THE INVENTION

The present invention relates to a lighting guide. More particularly, the present invention relates to an improved configuration of a light-transmitting member for use in hazardous environments.

BACKGROUND OF THE INVENTION

Lighting and illumination applications have particular operational requirements in hazardous areas, which are typically industrial and marine environments with harsh climatological conditions and varied hazard factors such as ambient dust, gas and more. Core operational requirements for any equipment, including lighting systems and devices, for use in such areas are codified as IEC and ATEX standards. These standards specify that lighting systems and devices for use in environments with, for instance, explosive characteristics caused by ambient gas or dust, must be designed to prevent any means of ignition arising, to limit the ignition energy of circuits, to prevent an explosive mixture reaching a means of ignition and to prevent any ignition from spreading outside of the apparatus.

In this context, most of the improvements to hazard-proof lighting of the prior art have historically focused upon shock-proofing part or all of the casing of lighting devices, as most such devices still use fluorescent or incandescent light sources, typically light bulbs with a glass casing enclosing either a filament with an inert gas atmosphere, or internally coated with phosphor and enclosing mercury vapor, all of which inherently fragile. Well-known examples of shock-proofing include for instance replacing the plastic casing of lighting devices intended for domestic or office use with a metal casing for industrial use, and covering light source covers made of substantially transparent glass or plastic with a metal mesh.

With the development of high-efficiency and high-power Light-Emitting Diodes ('LEDs'), it has become possible to use LEDs for lighting and illumination applications. There are numerous technical advantages to the use of LEDs, by comparison to traditional fluorescent and incandescent light sources. LEDs generate electroluminescence from a very low voltage and radiate negligible heat, so are unlikely to damage adjacent objects or fabrics. LEDs have a comparably very low failure rate wherein such failing is by dimming over time rather than an abrupt total failure. LEDs have a significantly longer useful life, frequently estimated at between at least 10,000 hours to multiples of this period, to be contrasted with the useful life of incandescent light bulbs estimated at between 1,000 and 2,000 hours. LEDs are moreover solid-state components, so are difficult to damage with external shock, unlike fluorescent and incandescent bulbs. The adoption of LED light sources has accordingly improved the operational safety of lighting devices and assemblies However, a shortcoming of LEDs in lighting applications, is that LEDs typically have a very small area, often less than 1 $mm^2$ and cannot provide divergence below a few degrees, whereby single LEDs do not approximate a point source of light giving a spherical light distribution, of the sort provided by traditional bulbs, including the more modern Compact Fluorescent Lamps ('CFLs'). LEDs are therefore difficult to apply to uses needing a spherical light field, such as lighting and illumination applications in hazardous areas.

SUMMARY OF THE INVENTION

When large quantities of light are needed, many LEDs are usually deployed, which are difficult to focus or collimate towards the same target. The present invention is a novel configuration for a lighting guide, adapted to collimate a minimal number of point light sources, such as LEDs for instance, into a spherical or semi-spherical light distribution.

According to an aspect of the present invention, there is provided a lighting guide for a lighting apparatus, comprising an elongate and substantially transparent member having opposed ends, wherein a longitudinal portion of an outer surface of the member is linearly recessed symmetrically about a transversal main axis of the member, and wherein a transversal distance of the recessed portion relative to a longitudinal portion of the outer surface opposed to the recessed portion increases progressively in either direction away from the transversal main axis of the member.

The recessed surface collimates any light source applied to it transversally along the main axis of the member towards the longitudinal portion which is not recessed, whereby the elongate member advantageously forms a plano-concave cylindrical lens.

In an embodiment of the lighting guide, the recessed outer surface is a rear surface of the member. Light energy directed towards the recessed outer surface within the lighting guide is diffracted by the internal surface of the recess and diffracted by same towards the outer surface opposed to the recessed outer surface, which is a front outer surface and which emits a corresponding light field.

In an embodiment of the lighting guide, the recess is a cut-away portion. At its simplest, the lighting guide may consist of a bar of Lucite™ or the like machined to recess the longitudinal portion of its outer surface, wherein such machining is considered a particularly simple and cost-effective approach to implementing the invention. Accordingly, in an embodiment of the lighting guide, the elongate and substantially transparent member is a rod, but variants of this embodiment may have a substantially circular cross-section, or a partially square cross-section. Moreover, embodiment of the lighting guide may be made of a glass, plastic, polymer and/or composite material.

In an embodiment of the lighting guide, at least a portion of the recessed surface is covered with a reflective coating. The reflective coating advantageously increases the reflectance of the recessed surface whereby, for a given application having a same light field requirement, a light source of lesser power may be used.

In an embodiment of the lighting guide, the recessed portion is longitudinally shaped substantially as a V. The lighting guide of this embodiment may advantageously be used in applications requiring a particularly bright light field at a location corresponding to the apex of the recess, for instance to collimate more light towards a sign or word embedded within a surface of a lighting device adjacent the lighting member.

In an embodiment of the lighting guide, the recessed portion is longitudinally shaped as a curve. The lighting guide of this embodiment may advantageously be used in applications requiring a uniformly gradual light field along a substantial portion of the length of a lighting device. Accordingly, in an embodiment of the lighting guide, the longitudinal portion extends over at least half of a total length of the member.

According to another aspect of the present invention, there is also provided a lighting apparatus comprising an embodiment of a lighting guide incorporating the inventive principles disclosed herein, and first and second light sources located adjacent respective and opposed ends of the lighting guide member.

In an embodiment of the lighting apparatus, each of the first and second light sources is a focussed point light source. In particular, each of the first and second light sources may be a LED.

Embodiment of the lighting apparatus may be sealed against ingress of a liquid or gas. For instance, any interstitial space or volume between the light sources and the member extremities may be filled with a resin or other encapsulating agent.

Other aspects are as set out in the claims herein.

BRIEF DESCRIPTION OF THE DRAWINGS

For a better understanding of the invention and to show how the same may be carried into effect, there will now be described by way of example only, specific embodiments, methods and processes according to the present invention with reference to the accompanying drawings in which:

FIG. 1 shows a lighting apparatus including a fluorescent light bulb of the prior art;

FIG. 2 shows the lighting apparatus of FIG. 1, wherein the fluorescent light bulb has been replaced with an embodiment of a lighting guide according to the invention;

DETAILED DESCRIPTION OF THE EMBODIMENTS

Figure 3:
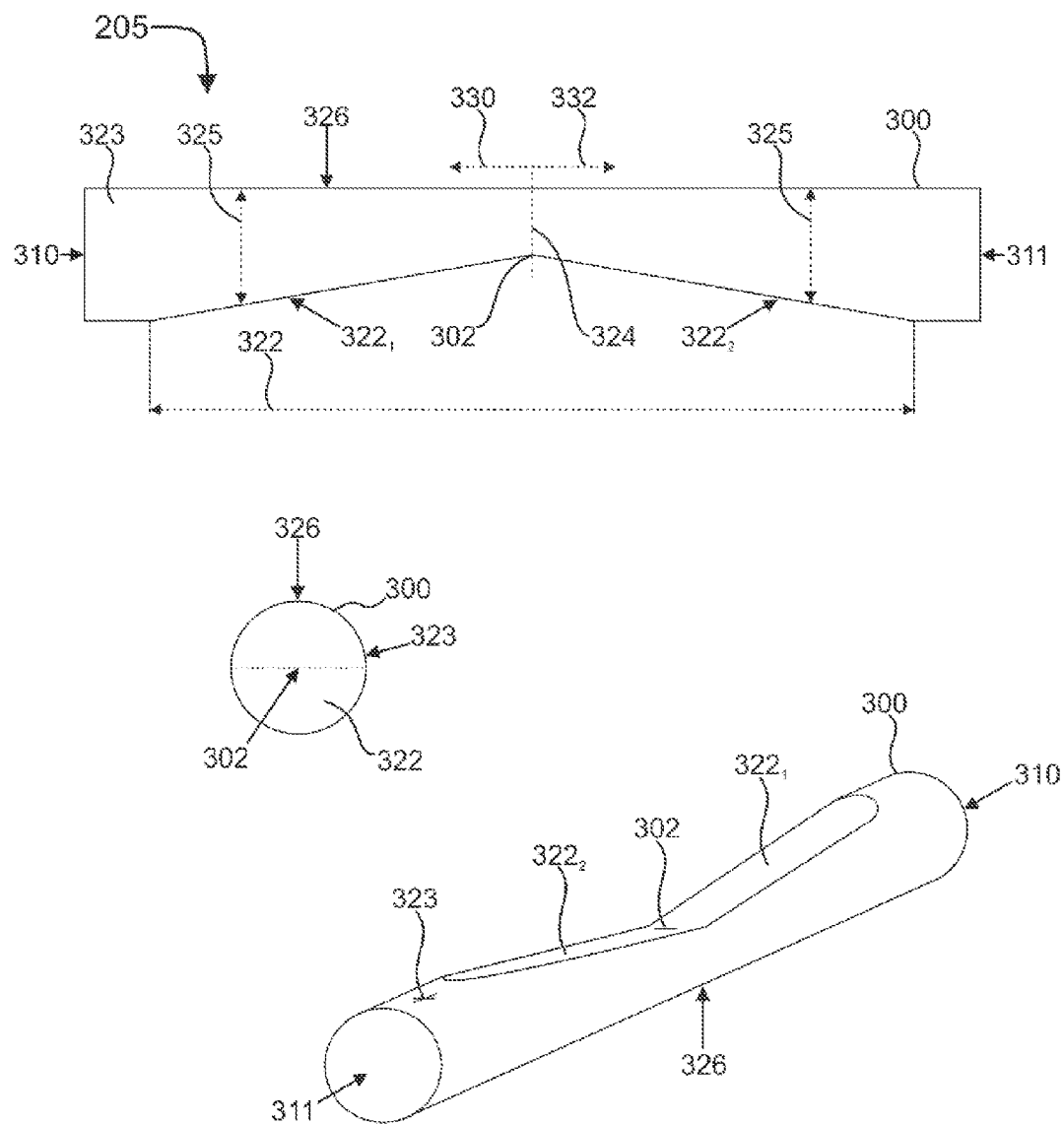
FIG. 3 shows side, section and perspective views of another embodiment of a lighting guide according to the invention.

There will now be described by way of example a specific mode contemplated by the inventors. In the following description numerous specific details are set forth in order to provide a thorough understanding. It will be apparent however, to one skilled in the art, that the present invention may be practiced without limitation to these specific details. In other instances, well known methods and structures have not been described in detail so as not to unnecessarily obscure the description.

With reference to FIG. 1 firstly, part of a lighting apparatus 100 for use in hazardous environments is shown in cut-away form. The apparatus 100 includes a stainless steel casing 101, electric connectors 102 for connection to a current supply (not shown) and mounting apertures 103 for fixing the apparatus 100 to a surface or an assembly.

The casing 101 is substantially rectangular and elongate, and defines a first part of an internal volume 104 within which a prior art light source 105, in the example a fluorescent gas discharge tube 105, is located substantially along a main axis of the lighting apparatus 100. The fluorescent tube 105 of the prior art is elongate and cylindrical, having a constant diameter 107 along its entire length, between the opposed longitudinal extremities of the internal volume 104.

The lighting apparatus 100 further comprises a substantially transparent cover 106 fixedly mounted to the casing 101 and sealably bounding a second part of the volume 104 extending along the main axis of the lighting apparatus 100 such that, in use, the light field 110 projected by the fluorescent tube 105 exits the volume 104 through the substantially transparent cover 106.

With reference to FIG. 2 now, the lighting apparatus 100 is again shown, wherein like references in the Figure designate like features. In this example, however, the fluorescent tube 105 of the prior art has been replaced with an alternative light source 200, comprising a lighting guide 205 and a pair of light sources $210_{1,2}$ fixed to the ends thereof. The lighting guide 205 is a substantially transparent rod of solid polymeric material, for example Lucite™ and each light source $210_N$ is fixedly mounted substantially co-axially with the longitudinal main axis of the rod 205 and casts its light into the interior of the rod 205 towards the other, opposed light source $210_{N'}$.

The lighting apparatus 100 again comprises a substantially transparent cover 106 fixedly mounted to the casing 101 and sealably bounding a second part of the volume 104 extending along the main axis of the lighting apparatus 100 such that, in use, the light field 110 projected by the lighting apparatus 200 exits the volume 104 through the substantially transparent cover 106.

It will be readily understood by the skilled reader that, in the event the light sources 210 require a form of current different from that supplied by the mains to the connectors 102, for instance direct current ('DC') rather than alternative current ('AC'), relevant current-transforming circuitry may be incorporated within the lighting apparatus 100 or even the light sources 210 themselves without difficulty.

The lighting guide 205 is an elongate and substantially transparent member having opposed ends 220, 221, wherein a longitudinal portion 222 of the outer surface 223 of the member is linearly recessed symmetrically about a transversal main axis 224 of the member 205. A transversal distance 225 of the recessed portion 222 relative to a longitudinal portion 226 of the outer surface opposed to the recessed portion 222 increases progressively in either direction away from the transversal main axis 224 of the member.

Lens types are defined by the curvature of the at least two optical surfaces thereof: a lens is convex when both surfaces are convex, concave when both surfaces are concave, plano-convex or plano-concave when one of the surfaces is flat, and convex-concave or meniscus when one surface is convex and the other concave. Meniscus lenses can be either positive or negative, depending on the relative curvatures of the two surfaces: a negative meniscus lens has a steeper concave surface and is thinner at the centre than at the periphery; conversely, a positive meniscus lens has a steeper convex surface and is thicker at the centre than at the periphery. A cylindrical lens focuses light passing therethrough onto a line, rather than onto a point as a spherical lens would: the curved face or faces of a cylindrical lens are sections of a cylinder, and focus the light passing therethrough onto a line parallel to the intersection of the surface of the lens and a plane tangent to it. The lens thus compresses the light in the direction perpendicular to this line, and leaves the light unaltered in the direction parallel to it, i.e. in the tangent plane. Thus, the convex surface of the longitudinal portion 226 of the outer surface 223 and the opposed concave surface of the recessed portion 222 effectively configure the lighting guide 205 transversally into a cylindrical meniscus lens.

Figure 4:
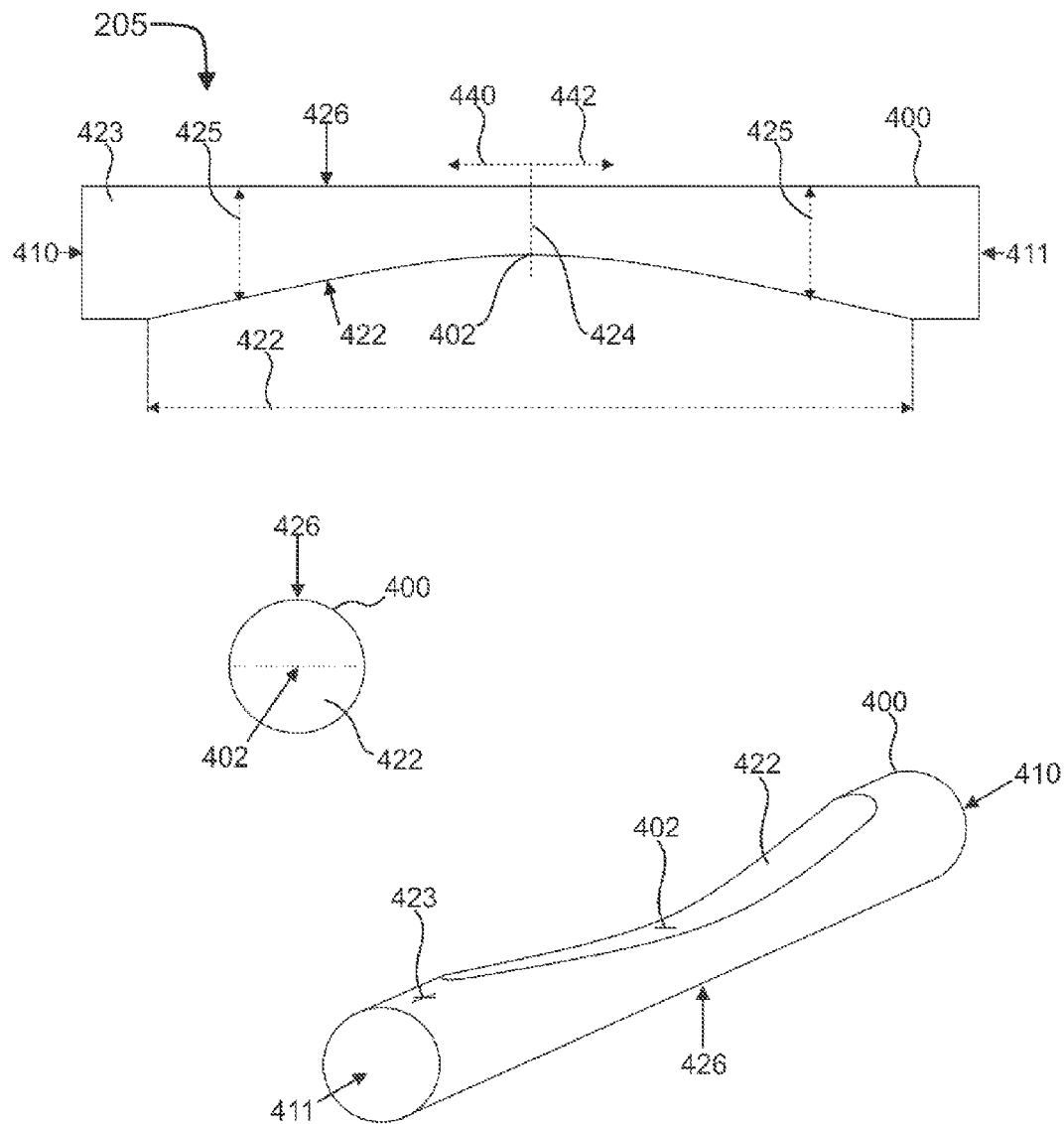
FIG. 4 shows side, section and perspective views of a further embodiment of a lighting guide according to the invention.
Figure 5:
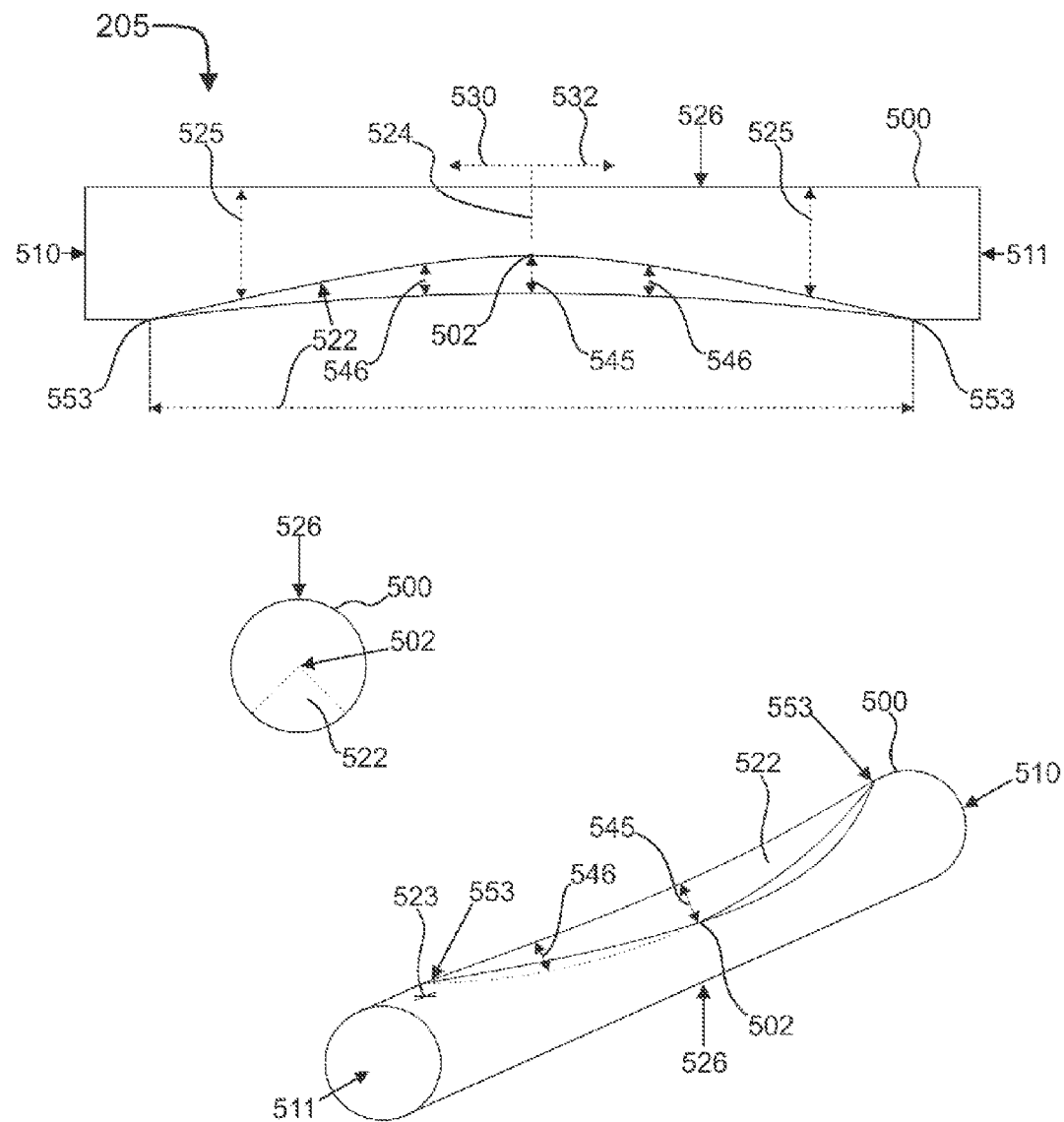
FIG. 5 shows side, section and perspective views of yet another embodiment of a lighting guide according to the invention.

FIGS. 3 to 5 respectively show three alternative embodiments of a lighting guide 205. In the embodiment shown in FIG. 3, the lighting guide 205 comprises a substantially cylindrical rod member 300 with an outer surface 323 longitudinally recessed as a flat-faced cut-away 322 shaped substantially as a V, with the apex 302 thereof located substantially at the geometrical centre of the member 300. The recessed portion 322 extends over most of the length of the member, between its opposed extremities 310, 311. The recessed portion 322 in this embodiment effectively takes the form of two planar and substantially rectilinear surfaces $322_1$, $322_2$ in symmetrical opposition one to the other, each extending from the apex 302 towards a respective extremity 310, 311 of the rod member 300, wherein the transversal distance 325 between each surface $322_1$, $322_2$ and the longitudinal portion 326 of the outer surface 323 opposed to the recessed portion 322 increases progressively in either direction 330, 332 away from the transversal main axis 324 of the member, which corresponds to the apex 302.

In the embodiment shown in FIG. 4, the lighting guide 205 again comprises a substantially cylindrical rod member 400 with an outer surface 423 longitudinally recessed as a flat-faced cut-away 422 shaped substantially as a V, with the apex 402 thereof located substantially at the geometrical centre of the member 400. The recessed portion 422 extends over most of the length of the member, between its opposed extremities 410, 411. The recessed portion 422 in this embodiment effectively takes the form of a flat-faced continuous curve 422 symmetrically centred about the apex 402 between the opposed extremities 410, 411 of the rod member 400, wherein the transversal distance 425 between the curved surface 422 and the longitudinal portion 426 of the outer surface 223 opposed to the recessed portion 422 increases progressively in either direction 430, 432 away from the transversal main axis 424 of the member, which corresponds to the apex 402.

In the embodiment shown in FIG. 5, the lighting guide 205 again comprises a substantially cylindrical rod member 500 with an outer surface 523, longitudinally slotted and recessed as a cut-away 522 shaped substantially as a V, with the apex 502 thereof located substantially at the geometrical centre of the member 500. The recessed portion 522 extends over most of the length of the member, between its opposed extremities 510, 511.

The recessed portion 522 in this embodiment effectively takes the form of a longitudinally-slotted channel 522 transversally shaped substantially as a V and having a maximum depth 545 relative to the outer surface 523 at the level of the apex 502, with symmetrically-decreasing depth 546 either side of the apex 502 towards the opposed extremities 510, 511 of the rod member 500 whereby the channel 522 effectively tapers to a point 553 adjacent each extremity extremities 510, 511 of the rod member 500. As it nears each extremity 510, 511 of the rod member 500, the channel 522 thus narrows progressively and its depth likewise decreases progressively, to the point 553 of substantially the surface 523.

The channel 522 thus forms a continuous, slotted curve 522 symmetrically centred about the apex 502 between the opposed extremities 510, 511 of the rod member 400, wherein the transversal distance 525 between the curved slotted surface 522 and the longitudinal portion 526 of the outer surface 523 opposed to the recessed portion 522 increases progressively in either direction 530, 532 away from the transversal main axis 524 of the member, which corresponds to the apex 502.

Figure 6:
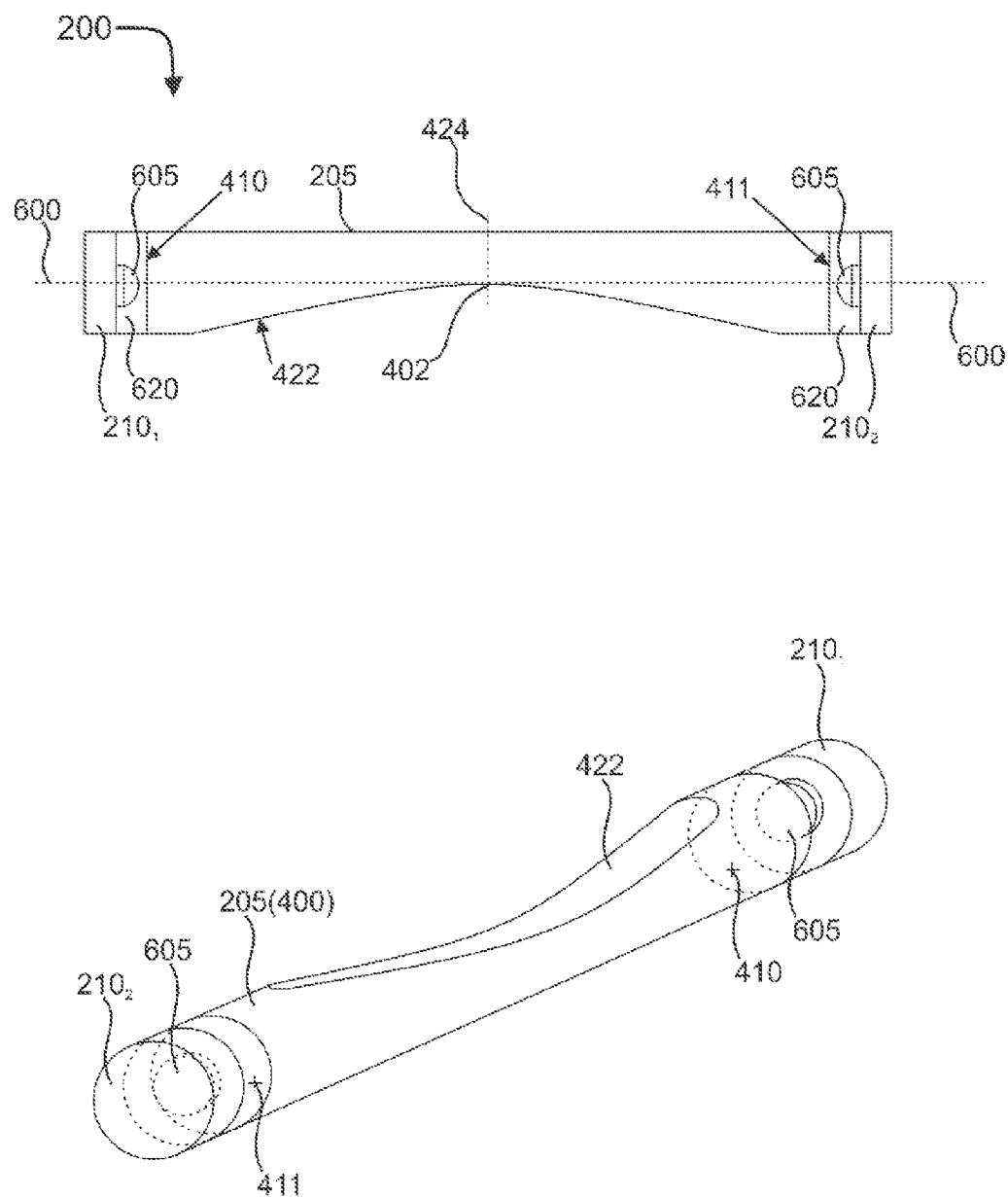
FIG. 6 shows side and perspective views of a lighting apparatus including the lighting guide of FIG. 4 and a pair of light sources fixed thereto.

With reference to FIGS. 2 and 6 now, an embodiment of a lighting apparatus 200 is shown based upon the lighting guide embodiment of FIG. 4, wherein two light sources $210_{1,2}$ are fixedly mounted, one to each extremity 410, 411 of the cylindrical rod member 400 co-axially with the main longitudinal axis 600 of the rod member 400, thus in axial alignment with each other. In this embodiment, each light source $210_N$ is a LED assembly having a point light source 605 oriented towards the rod member 400 and thus in opposition with the point light source 605 of the other LED assembly, such that both LEDs are directed towards the geometrical center of the rod member 400 and thus the apex 402 of the recessed portion 422.

The figure shows each light source spaced a short distance apart from the extremity 410, 411 of the rod member 400 adjacent thereto, and the interstitial volume 620 that exists in this embodiment between the light source 605 and the rod extremity 410, 411 is sealed with a resin or other encapsulating agent, both to prevent ingress of any foreign material between the light sources 605 and the rod member 400 and to further rigidify the lighting apparatus 200 into a single unit.

It will however be readily understood by the skilled person that light sources 210 may alternatively be mounted in abutment to the surface of the extremity 410, 411 in view of their cold lighting properties, and alternative embodiments may further provide for journaling the light source 605 within a corresponding blind hole machined into the rod extremity.

Figure 7:
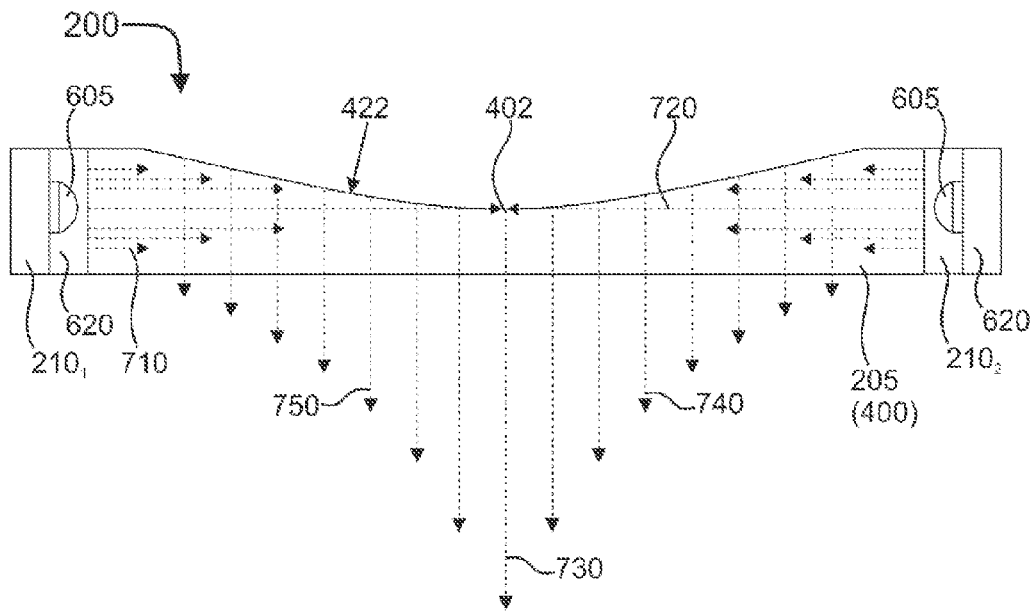
FIG. 7 illustrates light distribution by the embodiment of FIG. 6, wherein light distribution is represented figuratively with arrows.

With reference to FIG. 7, in use, light is emitted by each light source 210 in a direction substantially parallel to the main longitudinal axis of the lighting guide 205 towards its center 402. Each light source 210 is a point light source 605 emitting a beam of light with minimal divergence characteristics, therefore only some of the light energy 710 is emitted substantially tangentially to the main longitudinal axis of the lighting guide 205, and most of the light energy 720 is emitted substantially coaxially with the main longitudinal axis of the lighting guide 205.

As the light energy 710, 720 travels towards the center 402 of the lighting guide 205, the portion of light energy emitted along the portion of internal volume of the lighting guide 205 corresponding to the recessed portion 222 impacts and is diffracted 730 by the internal surface formed by the recessed portion 222 towards the rectilinear portion 226 of the outer surface of the lighting guide 205 opposed to the recessed portion 222.

As most of the light energy 720 is coaxial with the main longitudinal axis of the lighting guide 205, most of the light energy impacts and is diffracted by a section of the internal surface of the recessed portion 222 centred about the geometrical centre 402 of the lighting guide 205. On each side of this centred section, the remaining amount of light energy 710 divergent to the main lighting axis 720 impacts and is diffracted 740 by the section of the internal surface of the recessed portion 222 extending between substantially the extremity of the recessed portion 222 and that centred section, whereby the amount of diffracted light reduces 750 progressively away on either side of the geometrical centre of the lighting guide 205. This configuration advantageously provides a light field with symmetrically gradual luminosity, particularly useful for signposting applications.

Figure 8:
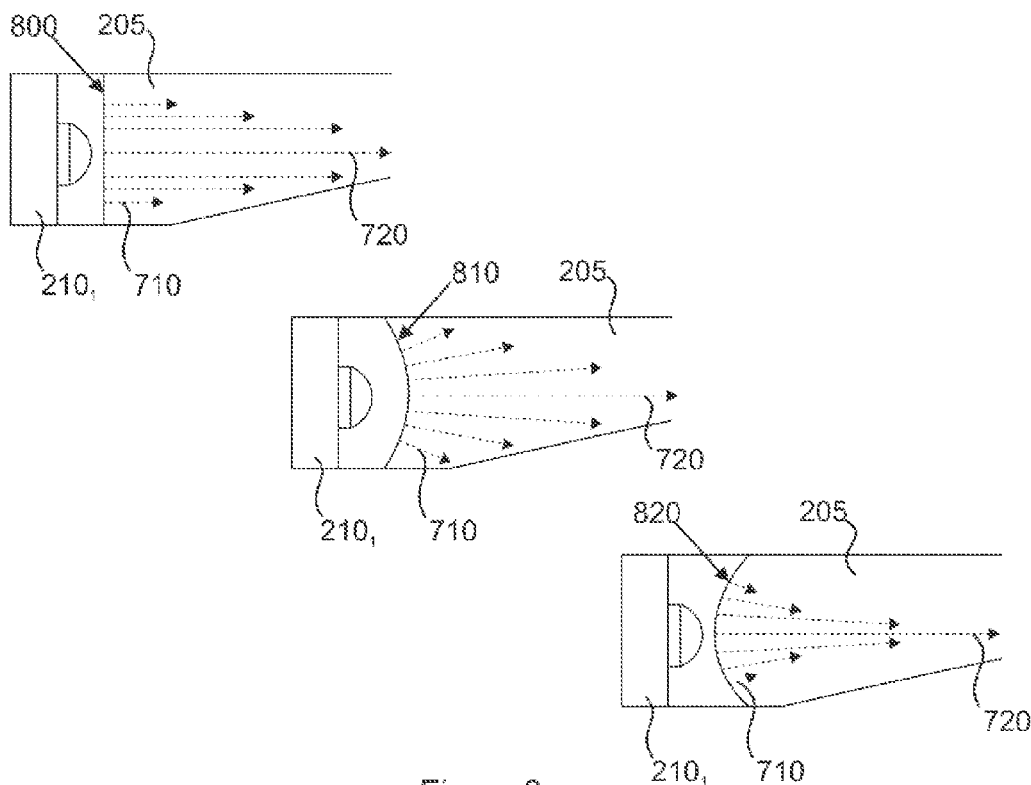
FIG. 8 shows alternative configurations for extremities of the lighting guide embodiments of FIGS. 2 to 7.

It will be readily understood by the skilled person that the respective properties of the lighting apparatus 200 and of the lighting guide 205 may be adapted to suit a wide variety of purposes and applications and, with reference to FIG. 8, embodiments are considered in which the geometry of the extremities 410, 411 of the lighting guide 205 may be suitably adapted for diverging or converging the emitted light 710, 720 so as to vary the properties of the light field.

In the example of FIG. 7, shown again in FIG. 8, the surface 800 of each extremity 410, 411 is substantially planar and perpendicular to the main longitudinal axis of the lighting guide 205, therefore perpendicular to the light 710, 720 emitted by the point light source 605 which it collimates. In a first alternative, the surface 810 of each extremity 410, 411 may instead be substantially concave relative to the point light source 605 rather than planar, to further diverge the light 710, 720 emitted by the point light source 605 away from the main longitudinal axis of the lighting guide 205. In a second alternative, the surface 820 of each extremity 410, 411 may instead be substantially convex relative to the point light source 605 rather than planar, to further focus the light 710, 720 emitted by the point light source 605 about the main longitudinal axis of the lighting guide 205.

The invention claimed is:

1. A lighting guide for a lighting apparatus, comprising an elongate and substantially transparent member having opposed ends;
   wherein a longitudinal portion of an outer surface of the member is linearly recessed symmetrically about a transversal main axis of the member;
   wherein a transversal distance of the recessed portion relative to a longitudinal portion of the outer surface opposed to the recessed portion increases progressively in either direction away from the transversal main axis of the member; and
   wherein the recessed portion extends over at least half of a total length of the member so as to collimate point light adjacent the lighting guide into a spherical or semi-spherical light distribution.

2. A lighting guide according to claim 1, wherein the recessed outer surface is a rear surface of the member.

3. A lighting guide according to claim 1, wherein the recessed portion is a cut-away portion.

4. A lighting guide according to claim 1, wherein at least a portion of the recessed surface is covered with a reflective coating.

5. A lighting guide according to claim 1, wherein the recessed portion is longitudinally shaped substantially as a V.

6. A lighting guide according to claim 1, wherein the recessed portion is longitudinally shaped as a curve.

7. A lighting guide according to claim 1, wherein the elongate and substantially transparent member is a rod.

8. A lighting guide according to claim 7, wherein the rod has a substantially circular or partially square cross-section.

9. A lighting guide according to claim 7, wherein the longitudinal portion of an outer surface of the member opposed to the recessed portion forms a plano-convex lens.

10. A lighting guide according to claim 1, wherein the member is made of a glass, plastic, polymer and/or composite material.

11. A lighting apparatus comprising a lighting guide according to claim 1; and first and second light sources located adjacent respective and opposed ends of the member.

12. A lighting apparatus according to claim 11, wherein each of the first and second light sources is a focussed point light source.

13. A lighting apparatus according to claim 11, wherein each of the first and second light sources is a LED.

14. A lighting apparatus according to claim 11, wherein the apparatus is sealed against ingress of a liquid or gas.

* * * * *